(No Model.)  5 Sheets—Sheet 1.
J. SIMPSON.
APPARATUS FOR MAKING PIPE.
No. 452,114. Patented May 12, 1891.
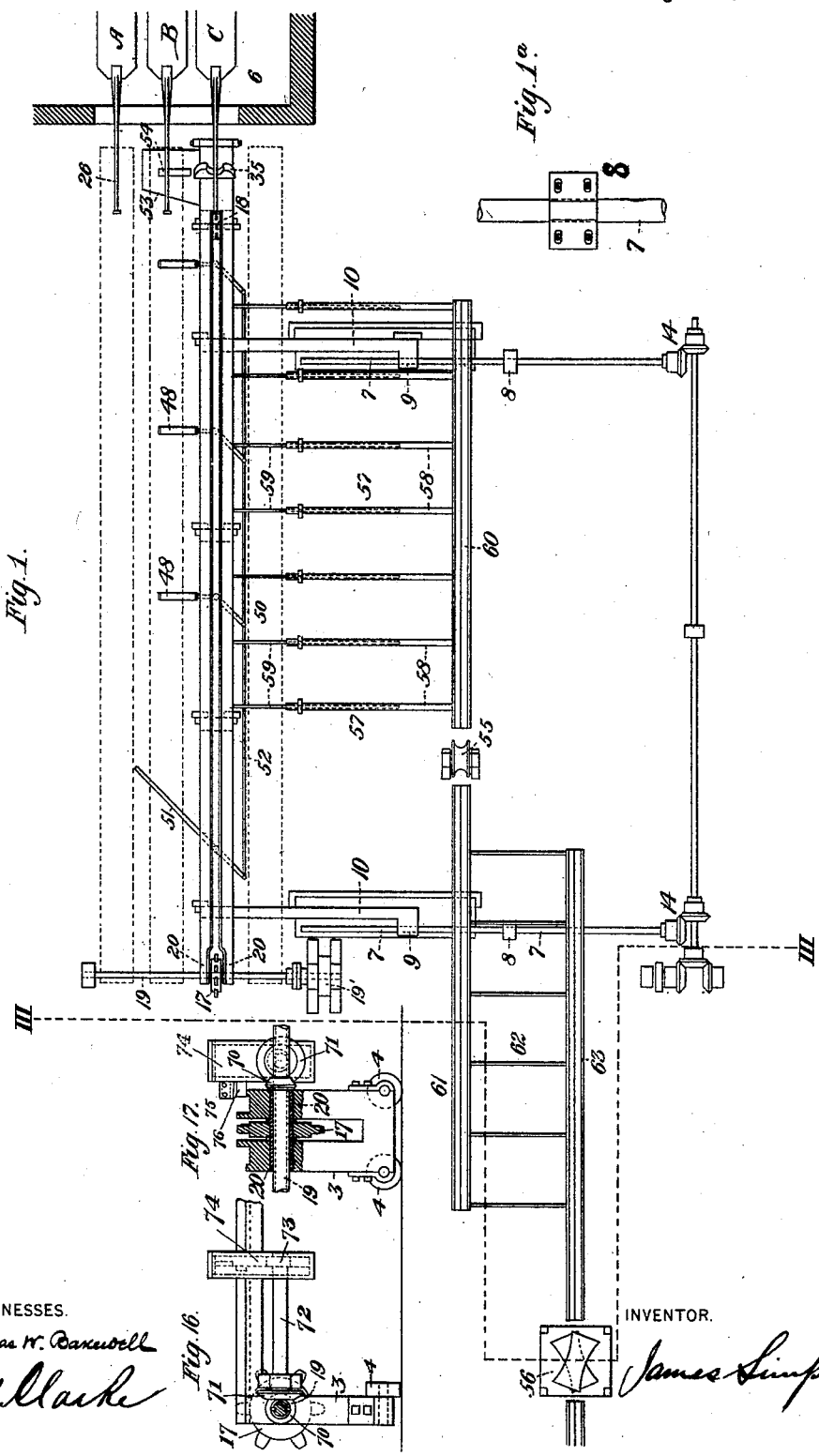
WITNESSES.
Thomas W. Bakewell
C. M. Clarke
INVENTOR.
James Simpson (No Model.) 5 Sheets—Sheet 2.
J. SIMPSON.
APPARATUS FOR MAKING PIPE.
No. 452,114. Patented May 12, 1891.
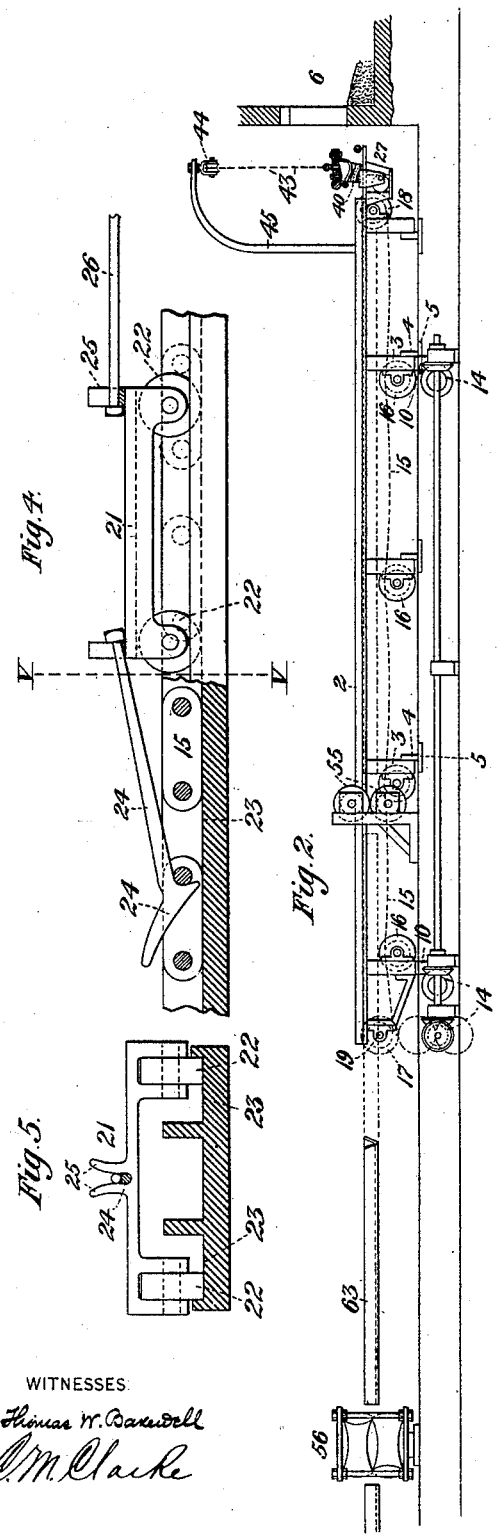
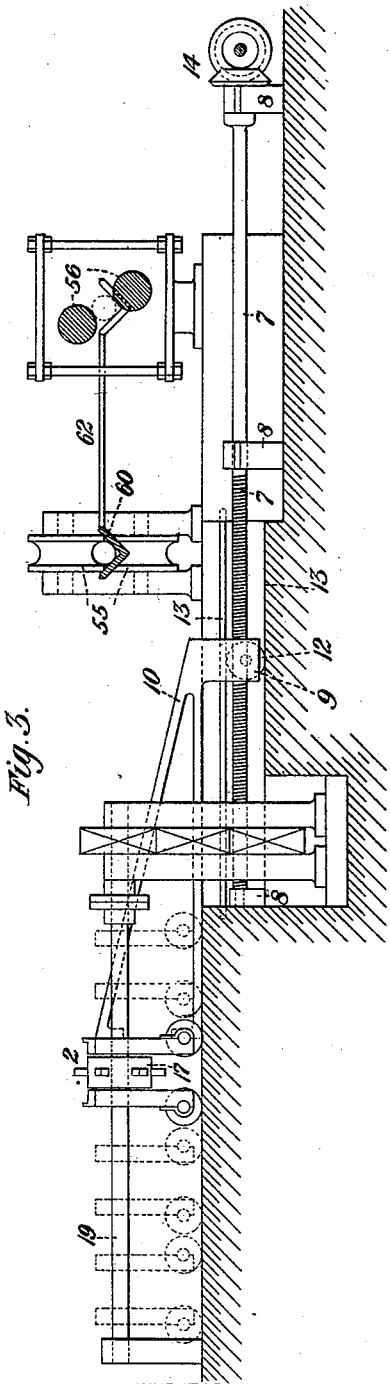
WITNESSES: INVENTOR.

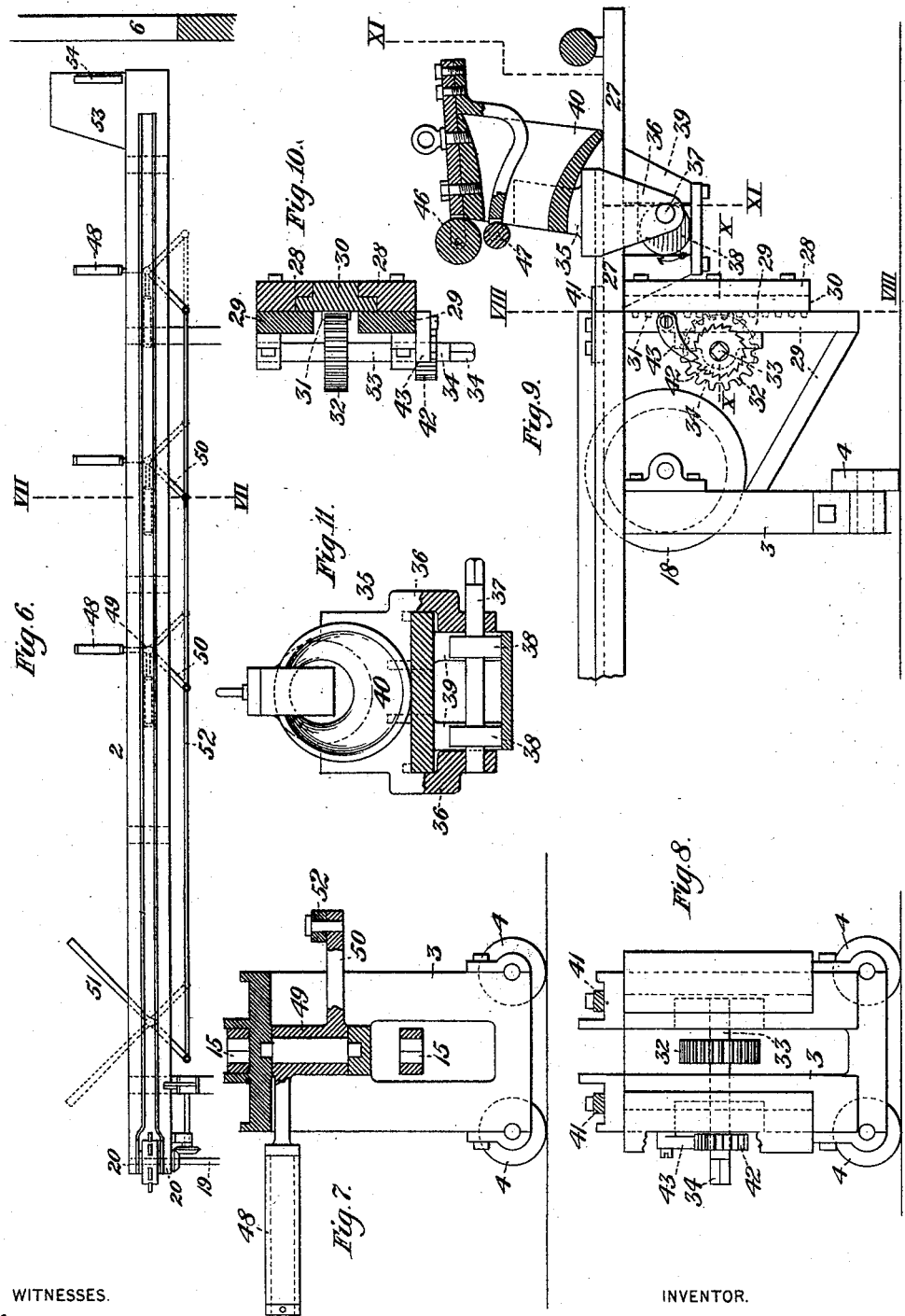

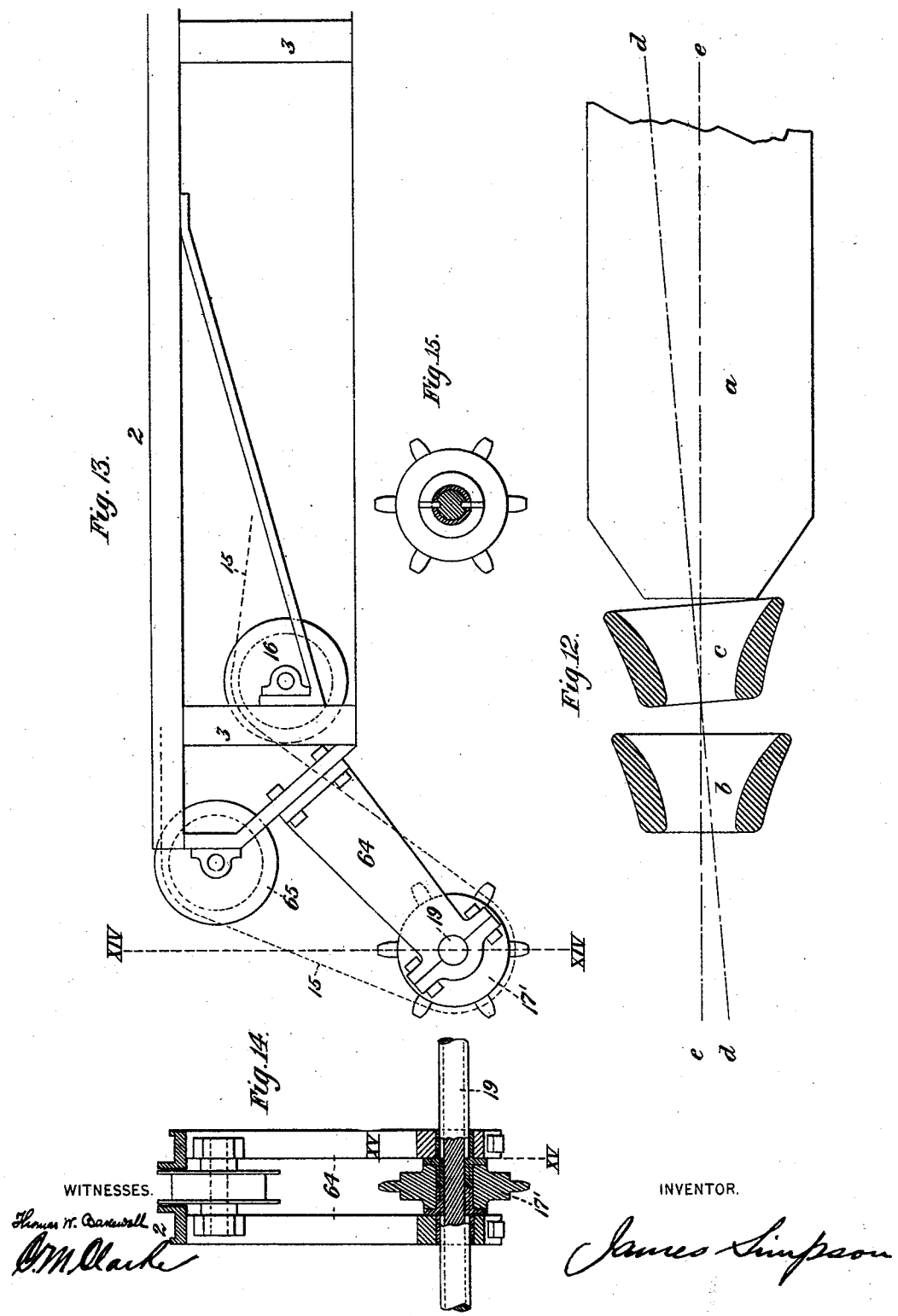

(No Model.) 5 Sheets—Sheet 5.

J. SIMPSON.
APPARATUS FOR MAKING PIPE.

No. 452,114. Patented May 12, 1891.

WITNESSES
INVENTOR

UNITED STATES PATENT OFFICE.

JAMES SIMPSON, OF McKEESPORT, PENNSYLVANIA.

APPARATUS FOR MAKING PIPE.

SPECIFICATION forming part of Letters Patent No. 452,114, dated May 12, 1891.

Application filed December 8, 1890. Serial No. 373,876. (No model.)

*To all whom it may concern:*

Be it known that I, JAMES SIMPSON, of McKeesport, in the county of Allegheny and State of Pennsylvania, have invented a new and useful Improvement in Apparatus for Making Pipe, of which the following is a full, clear, and exact description, reference being had to the accompanying drawings, forming part of this specification, in which—

Figure 19:
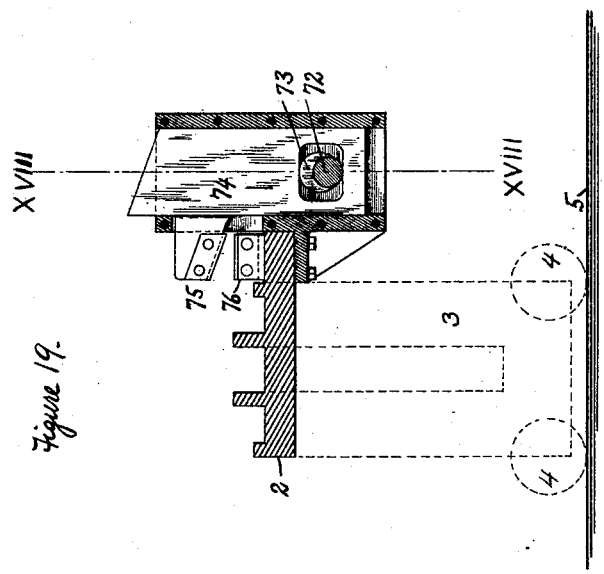
Figure 18:
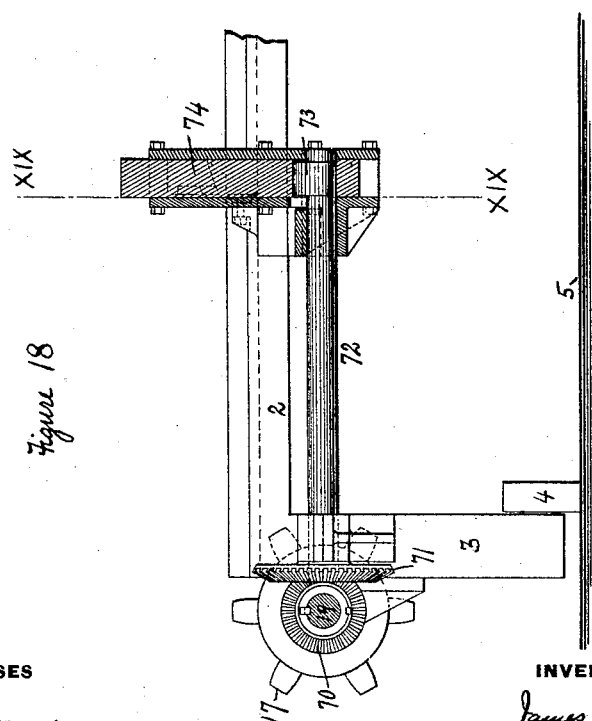

Figure 1 is a plan view showing a skelp-welding plant provided with my improved apparatus. Fig. 1ª is an enlarged detail view. Fig. 2 shows the bench in side elevation. Fig. 3 is a vertical section on the irregular line III III of Fig. 1. Fig. 4 is a side elevation, partly in section, of a portion of the bench and buggy. Fig. 5 is an end elevation of the buggy, showing the bench in vertical section on the line V V of Fig. 4. Fig. 6 is a plan view of the bench. Fig. 7 is an enlarged view of the bench, shown in section on the line VII VII of Fig. 6. Fig. 8 is a front view of the bench, shown as if in section on the line VIII VIII of Fig. 9. Fig. 9 is a side elevation of the front end of the bench, showing the bell in vertical section. Fig. 10 is a horizontal section on the line X X of Fig. 9. Fig. 11 is a vertical section on the line XI XI of Fig. 9. Fig. 12 is a diagram view explained hereinafter. Fig. 13 is a side elevation of the rear end portion of the bench. Fig. 14 is an end elevation, shown in vertical section on the line XIV XIV of Fig. 13. Fig. 15 is a vertical section on the line XV XV of Fig. 14. Fig. 16 is a back view of the device for shearing the tangs. Fig. 17 is an end view, partly in section, showing the manner of operating the shears. Fig. 18 is a sectional side elevation of the end of the bench, showing on a larger scale the shearing mechanism, the section-plane being on the line XVIII XVIII of Fig. 19; and Fig. 19 is a vertical transverse section on the line XIX XIX of Fig. 18.

Like symbols of reference indicate like parts in each.

My invention relates to an improvement in benches for drawing pipe and to the accessory apparatus used in connection therewith. It especially relates to an improvement in movable benches which carry the bell and the drawing apparatus, and are movable in front of the heating-furnaces in order to bring the bench opposite to the position of the skelp and to save the labor of shifting the heavy iron in the furnace. Movable benches having this general end in view have been devised before, the movement being permitted by supporting the bench so that it shall swing as on a pivot at the middle or rear end to cause its front end to travel in a circular arc before the furnace-door. A serious objection to the use of a bench arranged to move in this way is that as it is moved radially from opposite one skelp-plate to another its angle of inclination to the furnace of course changes, and if the plates of skelp-iron be set in the furnace, so that each shall occupy a position in line with the bench when opposite thereto, the plates will lie on the furnace-hearth in diverging positions in fan shape. This would require the rear part of the furnace to be made of greater diameter than the front—in fact, of so much greater diameter as to impair seriously its heating capacity. If on the other hand the plates be set in parallel positions in the furnace at right angles to the plane of the furnace-door, it is obvious that only one of the plates will be in line with the bench in proper position for drawing—*i. e.*, in line with the axis of the welding-bell. The other plates will lie at an angle to the bell, and when drawn therethrough are very apt, by reason of such inclination, to produce defective pipes. This is illustrated in Fig. 12, in which $a$ is the skelp. $b$ represents the position that the bell on a swinging bench would occupy relatively to one of the skelp-plates, and $c$ represents the position occupied by the bell relatively to one of the other plates. Now when the plate is drawn through the bell $c$, whose axis $d\ d$ is inclined to the middle line $e\ e$ of the skelp, there will be a twisting action exerted on the latter which will tend to produce an imperfect pipe.

My invention affords means for preventing entirely this evil; and it consists in arranging the bench so that instead of moving with a radially-swinging motion it shall travel laterally in parallel lines to the front of the furnace, so that in every position of the bench it shall be in line with the skelp before which it is.

Another object of my invention is to provide means for disengaging from the bell-holder the skelp and bell when for any reason the skelp happens to stick or if it breaks or tears at any point. The difficulty of lifting and handling the hot skelp has made the work of disengaging it in such case somewhat difficult, whereas the injurious effects of permitting it to remain too long in the furnace make it very desirable that its disengagement and removal be effected as rapidly as possible.

To this end my invention consists in providing a draw-bench (whether movable or stationary) with a bell-holder which is vertically movable and also longitudinally movable, so that when the skelp is to be disengaged the bell-holder may be moved lengthwise to free it from the bell, and may then be dropped out of the path of the bell, leaving the skelp free to be drawn out by the buggy and chain from the heating-furnace.

The invention also consists in providing a movable bench with shears actuated by power mechanism, so that when desired the tang or any part of the skelp may be cut off without taking the skelp from the bench.

It also consists in improved means applied to the bench for the purpose of facilitating the charging of the skelp-plates into the furnace; and it further consists in certain details of construction hereinafter more particularly specified.

Referring now to the drawings, 2 represents the bench, having upright legs 3 arranged at intervals, with rollers 4 at their lower ends, which rest upon plates 5 on the mill-floor, so that the bench shall be adapted to be moved transversely in front of the skelp-heating furnace 6. Mechanism of various known kinds may be used for imparting this lateral motion to the bench. A desirable form is illustrated in Figs. 1 and 3, in which 7 7 are screw-shafts which extend in a direction at right angles to the bench and are journaled in suitable bearings 8. These shafts pass through nuts 9 on brackets 10, which extend laterally from the bench, and the nuts are preferably provided with rollers 12, which travel between plates 13 above and below them, so that the nuts are supported and prevented from rising and the weight of the brackets is taken from the screw-shafts. The screw-shafts are rotated by gearing 14, arranged as shown in Fig. 1, so as to be capable of reversal to move the table laterally in either direction. In such motion it is clear that the ends of the bench move in parallel lines, and that its right-angled position relatively to the front of the furnace is constantly maintained.

In order to prevent the screw-shafts from being bound in their nuts by longitudinal expansion of the bench under the influence of the heat of the skelp, I provide the bearings 8, in which one of the shafts is journaled, with longitudinal slots through which pass the bolts which secure it to the mill-floor. (See Fig. 1ª.)

15 is an endless chain extending lengthwise of the bench over chain-wheels 17 18, arranged at the ends thereof, one branch of the chain resting on the surface of the bench, as shown in Figs. 4 and 7, and the lower branch being supported by pulleys 16 below the top of the bench. The rear chain-wheel 17 is rotated by a transverse shaft 19, driven by pinions 19', on which shaft the wheel is set with a feather-and-spline traveling connection between brackets 20 on the bench, so that the lateral motion of the bench will carry the wheel with it and will not interrupt its rotation. The bench is provided with a suitable traveling buggy 21, Figs. 4 and 5, which may be of usual construction and is supported by wheels 22 on tracks 23 on the surface of the bench. The buggy may have the usual hooked arm 24 for detachably hitching it to the chain 15, and at its front end has a horn 25 for detachably holding the tang 26 of the skelp. The bell-holder is situated at the front end of the bench, as illustrated in Figs. 2 and 9, and, as already explained, is constructed so as to be capable of vertical and longitudinal motion. To afford the vertical motion to the bell-holder, the front end 27, Figs. 9 and 10, of the bench is made separate from the remainder thereof, and has an upright leg 30, which is secured by slide-pieces 28 to a bracket 29 on the bench proper. The leg 30 has fixed to it a vertical rack 31, into which meshes a pinion 32, fixed to a shaft 33, which has its bearings in the bracket 29. The end of this shaft is squared to receive a wrench, as at 34, and by rotating the shaft the pinion is caused to act on the rack and to move the section 27 of the bench in a vertical direction.

The bell-holder 35 is mounted on the section 27 of the bench in the manner of a saddle, having downwardly-extending portions 36, in which is journaled a shaft 37, to which are fixed eccentric cams 38, set in yokes 39, which depend from the under side of the section 27 of the table. If the shaft 37 be rotated, the turning of the cams 38 in the yokes 39 will move the bell-holder longitudinally on the bench to the extent of the throw of the cams.

As thus constructed, the operation of the device is as follows: The plates A B C of the skelp-iron to be welded are charged into the heating-furnace, as shown in Fig. 1, and when properly heated, the bench being then opposite to one of the plates, the tang 26 is put through the bell 40 and is attached to the horn of the buggy. The hook 24, Fig. 4, is put into engagement with the moving chain, which, drawing on the buggy, pulls it along the bench and pulls the skelp through the bell, turning up its edges and welding them together. When the skelp has been completely drawn through the bell, it is removed from the bench in the manner hereinafter described, and then by rotation of the screw-shafts 7 the bench may be moved laterally to bring it opposite to another plate of skelp-iron, the buggy is drawn back on the bench, another skelp-plate attached thereto and drawn through the bell, and so the operation is continued until all the plates have been welded. If in drawing the skelp it should break or tear so as to make it impossible to continue the welding, it is desirable to remove it as quickly as possible from the furnace; but in order to do this the bell first must be disengaged from the bell-holder. This I effect by turning the cams 38 in the direction of the arrow in Fig. 9, thereby sliding the bell-holder on the bench away from the furnace and from the bell, and then rotate the shaft 33, so as to drop the table-section 27 and the bell-holder down below the skelp, leaving the latter free to be drawn with the bell along the bench and away from the furnace. The table-section may then be raised and the bell-holder moved thereon to its original position. To prevent the table-section from being lifted too far and to afford easy means for bringing it into proper position, I employ a stop 41, Fig. 9, which projects from the end of the table, and to hold it from dropping I fix to the shaft 33 a ratchet-wheel 42, provided with a locking-pawl 43, which must be lifted before the shaft can be turned, so as to cause the descent of the table-section.

For the purpose of supporting the welding bell and enabling it to be raised from the bench and pulled down into position thereon, I may suspend it by a chain 43', Fig. 2, from a pulley 44 on a post or standard 45, which is fixed to the bench so as to move therewith. The bell itself may be of any suitable construction. I have shown in the drawings a bell provided with internal and external rollers 46 47, arranged as claimed in Letters Patent No. 437,726, granted to me on October 7, 1890.

In practice I prefer to use the traveling bench both for charging and drawing the skelp. To this end I employ the devices shown in Figs. 1, 6, and 7. 48 48, Figs. 1, 6, and 7, are arms fitted with encircling rollers, which project or adapted to be projected from under the bench, being fixed to hubs 49, which are journaled to the under side of the bench on vertical axes, and have arms 50 projecting laterally to the other side of the bench and connected together and to a hand-lever 51 by a connecting-rod 52. In the operation of this connecting-rod the arms 48 may be caused to project, as shown in Figs. 1 and 6 by full lines, or may be retracted beneath the bench, as shown in Fig. 6 by dotted lines. At the front end of the bench is a laterally-projecting shelf 53, on which is journaled a roller 54. When it is desired to charge the furnace, the table is moved so as to bring the shelf 53 opposite the place in the furnace, into which the skelp is to be charged, and then the roller-arms 48 being projected the skelp is moved longitudinally on these arms and on the roller 54 into the furnace. After charging all the skelp-plates the bench is brought into position before the skelp A, which is then drawn through the bell. It is then moved laterally opposite to the skelp B, thus bringing the arms 48 and roller 54 opposite the original position of skelp A, and with the bench in this position the skelp B is drawn and another skelp is fed to the furnace to replace the skelp A, so when the bench is moved opposite to the skelp C the roller and arms are in proper position to replace the skelp B. When the skelp has been drawn through the bell upon the bench, the tang is first cut off, preferably by means of the shears hereinafter described, and it is passed through rolls, by which its surface is finished and smoothed. These rolls usually comprise two sets, as shown in Figs. 1 and 2, one a pair of horizontal grooved rolls 55 and another a pair of axially-acting rolls 56, having their axes inclined to each other and known in the art as cross-rolls. As a convenient means of delivering the pipe to the rolls 55, I employ a table 57, Fig. 1, composed of bars fitted telescopically together, one set of bars 58 being fixed to stationary supports and the other set 59 secured to the bench and sliding on the bars 58. The bars 59 follow the bench in its motion and in every position thereof afford a table connecting it with the trough or guide 60, leading to the rolls 55. The welded skelp is rolled from the bench on the table 57 to the guide 60. It is then passed through the rolls 55 and delivered thereby upon a guide 61, from which it is moved laterally on a table 62 to a guide 63, leading to the cross-rolls 56.

In Fig. 13 I show a modified construction of the driven chain-wheel at the rear end of the bench. There the chain-wheel 17' is set between the arms of a bracket 64, which extends downwardly from the bench into a longitudinal trough, and the shaft 19 passes through a bushing in the interior of the chain-wheel, and is connected thereto by a feather-and-spline connection, as shown in Figs. 14 and 15. The chain passes over a pulley 65 at the end of the bench, and thence around the chain-wheel 17'. The shears which are used for cutting off the tang from the pipe are shown in Figs. 16, 17, 18, and 19, and are constructed and operated as follows: On the shaft 19 on the outer side of the bench is a bevel gear-wheel 70, connected to the shaft by a bushing having a feather-and-spline traveling connection with the shaft and in gear with a gear-wheel 71, fixed to a shaft 72, journaled in bearings extending lengthwise of the bench. On the shaft 72 is an eccentric cam 73, working in a yoke at the end of a vertically-moving knife-head 74, the shear-knife 75 of which acts in conjunction with a stationary knife 76. As shown most clearly in Figs. 18 and 19, the rotation of the shaft 19 will rotate the gear-wheels 70 and 71, and the latter, by driving the shaft 72 and the cam 73, will cause the knife-head 74 to reciprocate and the blade 75 to act in conjunction with the stationary blade 76. Because of the traveling power connection between the gear-wheel 70 and the shaft 19 this operation of the shears is effected in every position of the bench. Other means for operating the shears from the driven parts of the bench may be employed.

From the foregoing description it will be understood that many changes in the arrangement and construction of the different parts of the apparatus may be made without departure from the principles of my invention. The bench may be used not only for welding skelp to make pipe, but also for bending skelp in dies to fit it for being rolled in the manufacture of lap-welded pipe. In such case the pipe-welding bell should be replaced by an ordinary bending-die.

I claim—

1. In pipe-making apparatus, the combination, with a heating-furnace, of a bench provided with skelp-drawing mechanism and movable laterally in front of the furnace in substantially parallel lines therewith, and mechanism for so moving the bench laterally, substantially as and for the purposes described.

2. In pipe-making apparatus, the combination, with a heating-furnace, of a bench mounted on wheels and provided with skelp-drawing mechanism and movable laterally in front of the furnace in substantially parallel lines therewith, and mechanism for so moving the bench laterally, substantially as and for the purposes described.

3. In pipe-making apparatus, the combination, with a heating-furnace, of a bench provided with skelp-drawing mechanism and movable laterally in front of the furnace in substantially parallel lines therewith, and screw-shafts extending transversely to the bench and connected therewith to move it laterally, substantially as and for the purposes described.

4. In pipe-making apparatus, the combination, with a heating-furnace, of a bench having an endless chain and a driven chain-wheel for drawing the skelp, said bench being movable laterally in front of the furnace in lines substantially parallel therewith, a driven shaft connected with the chain-wheel by a traveling power-connection, and mechanism for moving the bench laterally, substantially as and for the purposes described.

5. In pipe-making apparatus, the combination, with the draw-bench, of a bell-holder longitudinally movable relatively to the line of motion of the skelp on the bench, and also movable vertically relatively to the horizontal plane of said motion, substantially as and for the purposes described.

6. In pipe-making apparatus, the combination of the draw-bench having at its end next the furnace a vertically-movable section, a bell-holder mounted thereon, and means for moving said section of the bench vertically, substantially as and for the purposes described.

7. In pipe-making apparatus, the combination of the draw-bench having at the end next the furnace a vertically-movable section and a bell-holder mounted thereon, substantially as and for the purposes described.

8. In pipe-making apparatus, the combination of the draw-bench having at the end next the furnace a vertically-movable section and a bell-holder longitudinally movable on the said section, substantially as and for the purposes described.

9. In pipe-making apparatus, the combination, with a heating-furnace, of a draw-bench having laterally-projecting arms adapted to support the skelp in charging it, substantially as and for the purposes described.

10. In pipe-making apparatus, the combination, with a heating-furnace, of a draw-bench having arms adapted to support the skelp in charging it and mechanism for projecting said arms laterally and retracting them, substantially as and for the purposes described.

11. In pipe-making apparatus, the combination, with a heating-furnace, of a draw-bench movable across the front of the furnace, a bell-holder and bell, and an elevated support for the bell carried by the bench, substantially as and for the purposes described.

12. In pipe-making apparatus, the combination, with a heating-furnace, of a draw-bench movable across the front of the furnace, pipe-drawing mechanism carried by the bench, shears also carried by the bench, and a traveling power-connection for said shears, whereby they may be operated at any position of the bench, substantially as and for the purposes described.

13. In pipe-making apparatus, the combination, with a laterally-movable draw-bench having a chain-driving shaft 19, of shears mounted on the bench and gearing connected with the shaft by a traveling connection, and connected also with the shears, substantially as and for purposes described.

In testimony whereof I have hereunto set my hand this 4th day of December, A. D. 1890.

JAMES SIMPSON.

Witnesses:
THOMAS W. BAKEWELL,
A. K. BAKEWELL.